Oct. 8, 1968 — R. J. CHILKO — 3,404,456

SWING-BLADE SAW

Filed Oct. 10, 1966

INVENTOR.

Robert J. Chilko

United States Patent Office 3,404,456
Patented Oct. 8, 1968

3,404,456
SWING-BLADE SAW
Robert J. Chilko, 3612 Joan Ave., Evansville, Ind. 47711
Filed Oct. 10, 1966, Ser. No. 585,583
4 Claims (Cl. 30—155)

ABSTRACT OF THE DISCLOSURE

A swing-blade saw characterized by a saw blade having cutting teeth sheathed in a non-operative position and movable to an operative position through single-handed operation, and where a spring means urges the saw blade for cutting action.

---

The present invention relates generally to saws and sawing operations and, in particular, to a novel concept utilizing a swing-blade action.

It is the principal object of this invention to provide saws which will employ the swing-blade action in order to enjoy the distinct advantages and advances in the art as will be described below. Two distinct and diverse embodiments of this invention are illustrated and specified in detail in order to show the general application of this invention.

A compact, lightweight hand saw which would be of special interest to hunters, campers and outdoorsmen utilizes a saw blade which is fastened to the saw body by a pin connection to afford the swing action. An extension spring linkage is provided to apply the saw feed force. Cutting action is afforded by rocking or sliding or a combination of these movements of the saw body at its point of contact with the workpiece. Compared to an equivalent length of the conventional folding saw known to the art, the swing blade saw can accommodate a larger workpiece with much greater facility.

The swing-blade action as applied to a tree-pruner saw offers the distinct advantage of starting the cut from the underside of the branch. After this initial cut is made, the saw is turned over to finish the cut from the top side. This eliminates the breaking or peeling of the branch which normally occurs when a conventional tree pruner saw as known to the art is employed.

The swing-blade concept includes not only the embodiment where the blade is pinned to the body member, which body member provides a means of hand grip or other suitable means of power application, but also the embodiment where the blade, or an extension thereof, is in a fixed position with respect to the hand grip or other suitable means of power with the body member being pinned to blade member or an extension thereof to provide the swing action.

The features and advantages to be gained in accordance with the present invention are described in detail in the following specification and claims. Also, the following illustrations are included:

Figure 1:
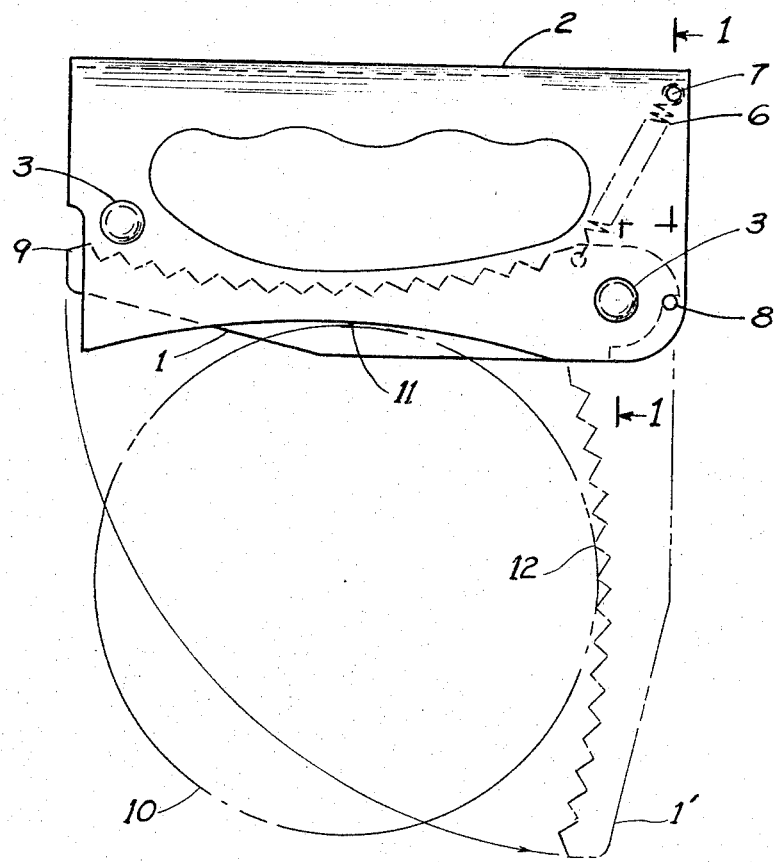
FIG. 1 is a side elevation view of the compact sportsmans saw.
Figure 2:
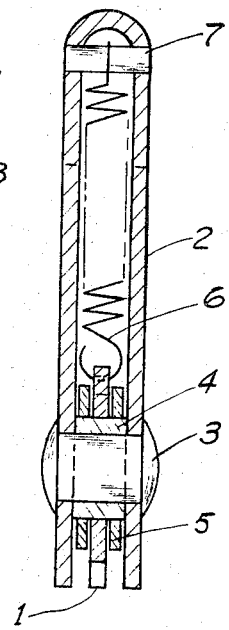
FIG. 2 is an enlarged cross-sectional view taken along offset section line 1—1 of FIG. 1.

The sportsmans compact swing-blade saw, FIG. 1 and FIG. 2 embodiment of this invention, has the swing-blade saw member 1 fitted to the saw body by means of a rivet 3 and spacer member 4. The length of the spacer member 4 is set to allow the swing-blade saw member 1 to clear the saw body 2 when in the closing or closed position as shown in FIG. 1. The same rivet 3 and spacer member 4 are used at the other end of the saw body.

Spacer washers 5 are used to center the swing-blade saw member 1. An extension spring 6 is attached to the swing-blade saw member and to the saw body at pin connection 7. A pin connection 8 across the saw body serves both as a positive stop for the swing-blade saw member 1 and as a safety stop in the event of blade breakage. The saw blade member 1 may be opened as a conventional folding saw or the exposed end 9 may be engaged to the workpiece 10 and pulled out for one-handed operation. The saw body 2 is provided with a cutout section to form a hand grip.

The swing-blade saw member position 1′ is shown in engagement with the workpiece 10. Cutting action is afforded by rocking or sliding the saw body at its point of contact 11 with the workpiece 10. This point of contact 11 may be considered fixed in both the saw body 2 and workpiece 10 during the cutting stroke or the said point of contact may be continuously changed on both the saw body 2 and workpiece 10 by means of a combination of a rocking and sliding movement of the saw body 2 about the surface of the workpiece which may be of circular cross-section as illustrated, or of other cross-sectional shape. In any case, the motion imparted to the saw body 2 is to be such that the distance between the center of rotation of the swing-blade and the then point of contact 12 between the swing-blade saw member 1′ and workpiece 10 is changed to accomplish the cutting action. In this embodiment, the center of rotation is the centerline of the rivet 3. The flexibility of saw body movement about and over the workpiece combined with the swing-blade action will readily provide a complete cut through a workpiece diameter equal to the blade length. This would not be possible with a conventional folding saw of equal blade length in that no clearance would be available for the necessary reciprocating motion.

Figure 3:
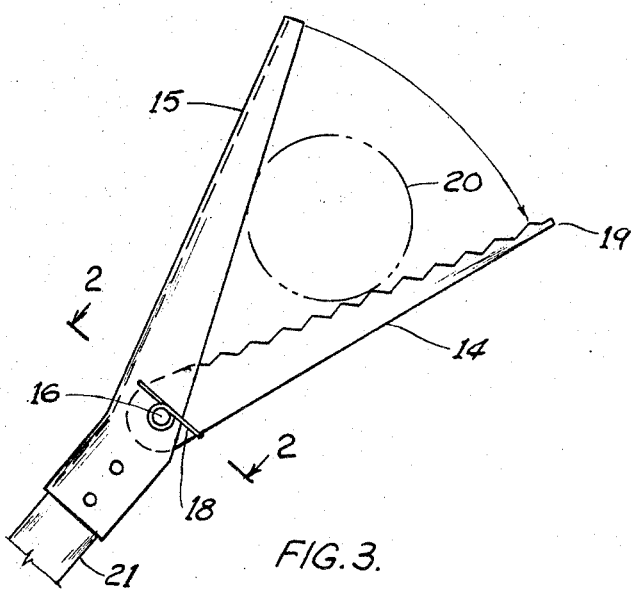
FIG. 3 is a side elevation view of the tree pruner saw.
Figure 4:
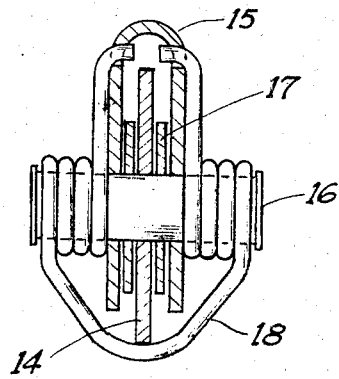
FIG. 4 is an enlarged cross-sectional view taken along section line 2—2 of FIG. 3.

The pruner-saw embodiment of this invention is shown by FIG. 3 and FIG. 4. The swing-blade saw member 14 is fitted to the saw body 15 by pin 16 and is centered by washers 17. A torsion spring 18 is used to provide the saw feed force. The closed loop end of the torsion spring 18 contacts the swing-blade saw member while the free ends are fixed in holes in the saw body 15. The tip 19 of swing-blade member 14 extends beyond the end of the saw body 15 when in the closed position to allow remote opening and engagement with the workpiece 20. The major advantage over conventional tree pruners is that the cut may be started at the bottom of the workpiece as illustrated. The swing blade pruner is then turned over to complete the cut from the top. This eliminates the usual peeling and splitting of the branch. The conventional pruning saw cannot be used to cut from the underside of the branch.

It is recognized that this embodiment can have the blade 14 rigidly fastened to the pole member 21 with the body member 15 pinned to pole member 21 or an extension thereof.

What I claim and desire to secure by Letters Patent is:
1. A saw comprising:
 a handle member having side surfaces, said side surfaces having forward and rearward edges and a pair of transverse end edges;
 an opening in said side surfaces forming a grip at said rearward edges;
 a saw blade having cutting teeth along one edge thereof being pivotally secured to said handle member adjacent said forward edges and one of said pair of end edges;
 means on said handle member to receive said saw blade;
 said saw blade being pivotable from a first closed position in which said cutting teeth thereof are sheathed by said means to a second position in which said cutting teeth are at a cutting angle with respect to said forward edges;

stop means on said handle preventing pivoting of said saw blade beyond said second position;

and spring means secured to said handle member and said saw blade to bias said saw blade to said closd position;

whereby said saw blade is selectively operative to cut a workpiece disposed between the same and said forward edges.

2. The saw of claim 1 wherein said handle member is of U-shaped cross-sectional configuration.

3. The saw of claim 1 where said forward edges of said handle member are concave with respect to said rearward edges.

4. A swing-blade saw comprising a blade having cutting teeth, a sheath pivotally mounting said blade and covering said cutting teeth thereof when said blade is in a non-cutting position, said blade being of substantially the same length as said sheath and having an end portion extending a short distance from said sheath for the selective operative engagement of a workpiece through one-handed usage and spring means between said sheath and said blade urging cutting action by said blade after said operative engagement of the workpiece.

References Cited
UNITED STATES PATENTS

| | | | |
|---|---|---|---|
| 627,711 | 6/1899 | Smith | 30—112 X |
| 1,310,904 | 7/1919 | Carter | 30—166 |
| 1,638,749 | 8/1927 | Santoyo | 145—31 X |
| 1,757,607 | 5/1930 | Zullo | 30—112 |
| 2,814,871 | 12/1957 | Childress | 30—166 |

ROBERT C. RIORDON, *Primary Examiner.*

R. V. PARKER, JR., *Assistant Examiner.*